(12) United States Patent
Kobayashi

(10) Patent No.: US 11,664,752 B2
(45) Date of Patent: May 30, 2023

(54) METHOD FOR CONTROLLING ELECTRONIC WATCH AND ELECTRONIC WATCH

(71) Applicant: Seiko Epson Corporation, Tokyo (JP)

(72) Inventor: Naohiro Kobayashi, Shiojiri (JP)

(73) Assignee: SEIKO EPSON CORPORATION

( * ) Notice: Subject to any disclaimer, the term of this patent is extended or adjusted under 35 U.S.C. 154(b) by 111 days.

(21) Appl. No.: 17/394,523

(22) Filed: Aug. 5, 2021

(65) Prior Publication Data

US 2022/0045636 A1 Feb. 10, 2022

(30) Foreign Application Priority Data

Aug. 6, 2020 (JP) .............................. JP2020-133913

(51) Int. Cl.
*H02P 8/02* (2006.01)
*G04C 3/14* (2006.01)

(52) U.S. Cl.
CPC . *H02P 8/02* (2013.01); *G04C 3/14* (2013.01)

(58) Field of Classification Search
CPC .................................. H02P 8/02; G04C 3/14
See application file for complete search history.

(56) References Cited

U.S. PATENT DOCUMENTS

| 6,072,752 A | 6/2000 | Igarashi et al. |
| 2010/0165796 A1* | 7/2010 | Ogasawara ............ G04C 3/143 368/80 |
| 2019/0302698 A1 | 10/2019 | Kawaguchi |
| 2019/0305702 A1 | 10/2019 | Kawaguchi |
| 2020/0036309 A1 | 1/2020 | Nagahama et al. |
| 2020/0119680 A1* | 4/2020 | Yoo ......................... H02P 23/14 |

FOREIGN PATENT DOCUMENTS

| JP | 2010-266302 A | 11/2010 |
| JP | 2017-215229 A | 12/2017 |
| JP | 2019-176705 A | 10/2019 |
| JP | 2019-176706 A | 10/2019 |
| JP | 2019-178893 A | 10/2019 |
| JP | 2020-016531 A | 1/2020 |
| WO | 1993/022712 A1 | 11/1993 |

* cited by examiner

*Primary Examiner* — Zoheb S Imtiaz
(74) *Attorney, Agent, or Firm* — Harness, Dickey & Pierce, P.L.C.

(57) ABSTRACT

A method for controlling an electronic watch is a method for controlling an electronic watch having a control device, the method comprising: when performing a first control processing, operating a first driving circuit to output a first motor drive signal, and rewriting a first polarity information in accordance with an output of the first motor drive signal, when ending output of the first motor drive signal, matching a second polarity information with the first polarity information, when performing a second control processing, operating a second driving circuit to output a second motor drive signal, and rewriting the second polarity information in accordance with an output of the second motor drive signal, and when ending output of the second motor drive signal, matching the first polarity information with the second polarity information.

13 Claims, 8 Drawing Sheets

METHOD FOR CONTROLLING ELECTRONIC WATCH AND ELECTRONIC WATCH

The present application is based on, and claims priority from JP Application Serial Number 2020-133913, filed Aug. 6, 2020, the disclosure of which is hereby incorporated by reference herein in its entirety.

BACKGROUND

1. Technical Field

The present disclosure relates to a method for controlling an electronic watch and an electronic watch.

2. Related Art

An electronic watch has been known that includes a pulse motor for driving a hand, a pulse motor drive means for driving the pulse motor, and a motor drive control means for controlling the pulse motor drive means (see, for example, WO 93/022712). The motor drive control means of the electronic watch included a drive polarity storage means for switching and outputting motor drive signals with different polarities, and storing polarity information thereof, when a hand was stopped due to battery voltage reduction or the like, the polarity information stored in the drive polarity storage means was stored in a non-volatile memory, and when the driving of the hand was resumed by battery replacement or the like, the polarity information was read from the non-volatile memory and motor drive signals were output.

Further, the electronic watch output a fast-forward signal from a fast-forward pulse generation circuit to fast-forward the hand.

However, in WO 93/022712, because the same pulse motor drive means was used during a normal hand operation and during fast-forward, it was difficult to set the pulse motor drive means so as to be suitable during both the hand operations.

SUMMARY

A method for controlling an electronic watch of the present disclosure, which is a method for controlling the electronic watch including a motor configured to drive a hand, a first polarity storage device configured to store first polarity information, a second polarity storage device configured to store second polarity information, a first driving circuit configured to output, to the motor, a first motor drive signal having a polarity corresponding to the first polarity information, a second driving circuit configured to output, to the motor, a second motor drive signal having a polarity corresponding to the second polarity information, and a control device configured to perform switching between first control processing and second control processing, the method including, when performing the first control processing, operating the first driving circuit to output the first motor drive signal, and rewriting the first polarity information in accordance with an output of the first motor drive signal, when ending output of the first motor drive signal, matching the second polarity information with the first polarity information, when performing the second control processing, operating the second driving circuit to output the second motor drive signal, and rewriting the second polarity information in accordance with an output of the second motor drive signal, and when ending output of the second motor drive signal, matching the first polarity information with the second polarity information.

A method for controlling an electronic watch of the present disclosure, which is a method for controlling the electronic watch including a motor configured to drive a hand, a first polarity storage device configured to store first polarity information, a second polarity storage device configured to store second polarity information, a first driving circuit configured to output, to the motor, a first motor drive signal having a polarity corresponding to the first polarity information, a second driving circuit configured to output, to the motor, a second motor drive signal having a polarity corresponding to the second polarity information, and a control device configured to perform switching between first control processing and second control processing, the method including, when performing the first control processing switching from the second control processing, matching the first polarity information with the second polarity information, operating the first driving circuit to output the first motor drive signal, and rewriting the first polarity information in accordance with an output of the first motor drive signal, and when performing the second control processing switching from the first control processing, matches the second polarity information with the first polarity information, operating the second driving circuit to output the second motor drive signal, and rewriting the second polarity information in accordance with an output of the second motor drive signal.

An electronic watch according to the present disclosure includes a motor configured to drive a hand, a first polarity storage device configured to store first polarity information, a second polarity storage device configured to store second polarity information, a first driving circuit configured to output, to the motor, a first motor drive signal having a polarity corresponding to the first polarity information, a second driving circuit configured to output, to the motor, a second motor drive signal having a polarity corresponding to the second polarity information, a first communication device, a second communication device configured to communicate with the first communication device, and a control device configured to perform switching between processing for operating the first driving circuit to output the first motor drive signal, and rewriting the first polarity information in accordance with an output of the first motor drive signal, and processing for operating the second driving circuit to output the second motor drive signal, and rewriting the second polarity information in accordance with an output of the second motor drive signal, wherein the control device performs processing for transmitting the second polarity information to the first communication device by the second communication device, and matching the first polarity information stored in the first polarity storage device with the second polarity information based on the second polarity information received by the first communication device, and processing for transmitting the first polarity information output by the first communication device to the second communication device, and matching the second polarity information stored in the second polarity storage device with the first polarity information based on the first polarity information received by the second communication device.

DESCRIPTION OF EXEMPLARY EMBODIMENTS

First Exemplary Embodiment

An electronic watch 1 according to a first exemplary embodiment will be described below with reference to the drawings.

Figure 1:
FIG. 1 is a front view illustrating an electronic watch according to a first exemplary embodiment.
Figure 2:
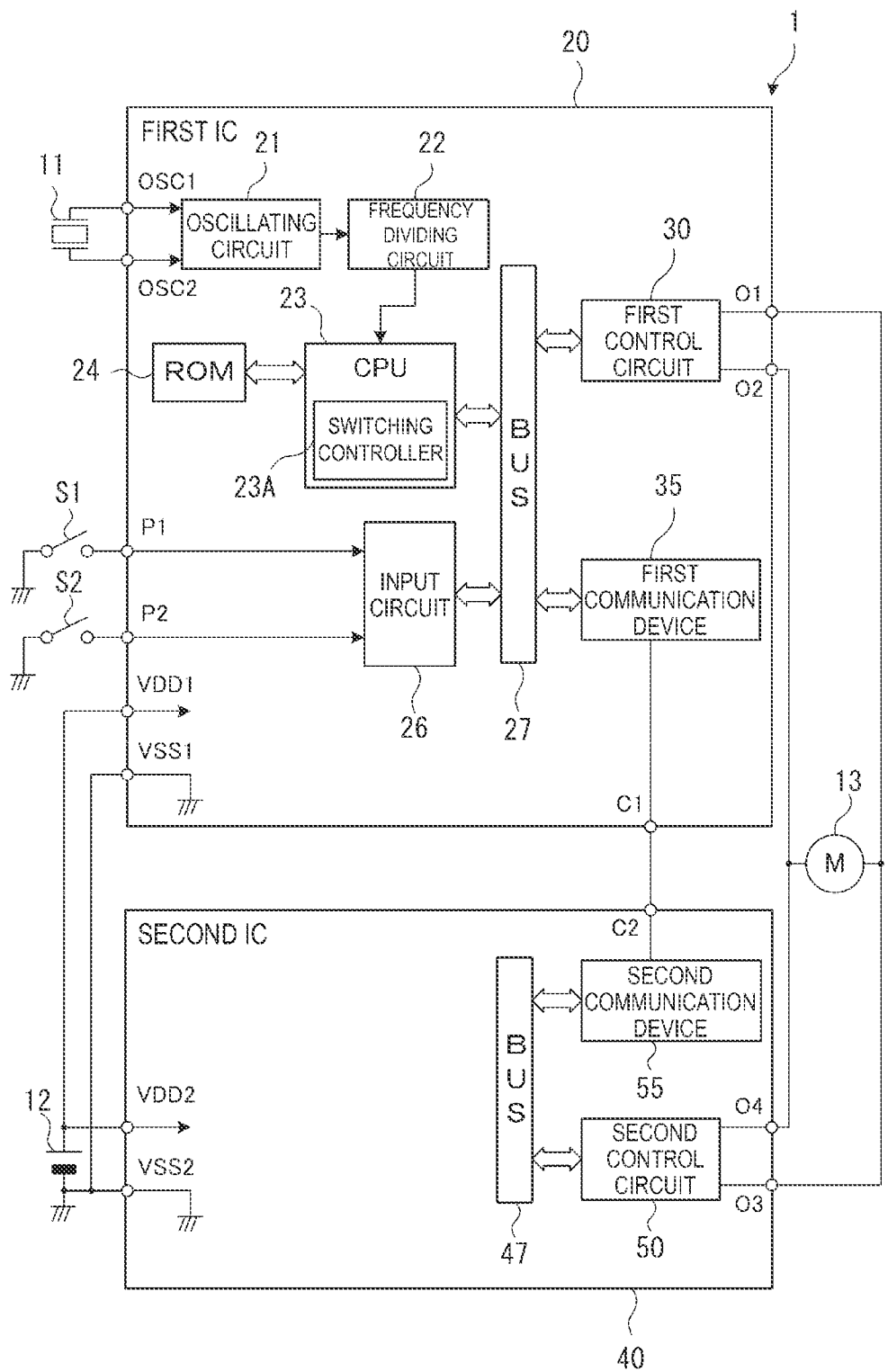
FIG. 2 is a block diagram illustrating a circuit configuration of the electronic watch according to the first exemplary embodiment.

As illustrated in FIG. 1, the electronic watch 1 is a wristwatch mounted on a user's wrist, and includes an outer case 2, a disk-shaped dial 3, a movement (not illustrated), and as illustrated in FIG. 2, a seconds hand 5, a minute hand 6, an hour hand 7, which are hands driven by a motor 13 provided inside the movement, and a crown 8 and a button 9, which are operation members.

As illustrated in FIG. 2, the electronic watch 1 includes a crystal oscillator 11 that is a signal source, a battery 12 that is a power source, a switch S1 that is turned on and off in conjunction with an operation of the button 9, a switch S2 that is turned on and off in conjunction with an extraction operation of the crown 8, the motor 13, a first IC 20, and a second IC 40 for the watch.

The motor 13 is a bipolar single-phase stepping motor used for the electronic watch, which is driven by a drive current output from the IC 20 or the IC 40, as described below.

The seconds hand 5, the minute hand 6, and the hour hand 7 are interlocked by a train wheel (not illustrated), and are driven by the motor 13 to display seconds, minutes, and hours, respectively. Note that, in the present exemplary embodiment, the seconds hand 5, the minute hand 6, and the hour hand 7 are driven by one motor 13, but a plurality of motors, for example, a motor that drives the seconds hand 5, and a motor that drives the minute hand 6 and the hour hand 7, may be provided.

The first IC 20 includes coupling terminals OSC1, OSC2 to which the crystal oscillator 11 is coupled, input terminals P1, P2 to which the switches S1, S2 are coupled respectively, power terminals VDD1, VSS1 to which the battery 12 is coupled, output terminals O1, O2 coupled to a coil of the motor 13, and a terminal C1 for communication with the second IC 40.

The crystal oscillator 11 is driven by an oscillating circuit 21, which will be described later, to generate an oscillation signal.

The battery 12 is constituted by a primary battery or a secondary battery. In a case of the secondary battery, charging is performed by a solar cell (not illustrated) or the like.

The switch S1 is input in conjunction with the button 9 at a 2 o'clock position of the electronic watch 1, and for example, is turned to an on state while the button 9 is pressed, and is turned to an off state while the button 9 is not pressed.

The switch S2 is a slide switch in conjunction with an extraction of the crown 8. In the present exemplary embodiment, the switch is turned to the on state with the crown 8 extracted to a 1st stage, and is turned to the off state when the crown 8 is at a 0th stage. Note that, a switch for detecting a rotational direction and an amount of rotation of the crown 8 may be provided separately.

The second IC 40 includes power terminals VDD2, VSS2 to which the battery 12 is coupled, output terminals O3, O4 coupled to the coil of the motor 13, and a terminal C2 for communication with the first IC 20.

Note that, in the present exemplary embodiment, a positive electrode of the battery 12 is coupled to the power terminals VDD1 and VDD2 on a high potential side, a negative electrode is coupled to the power terminals VSS1 and VSS2 on a low potential side, and the power terminals VSS1 and VSS2 on the low potential side are set to a ground.

Circuit Configuration of First IC 20

The first IC 20 includes an oscillating circuit 21, a frequency dividing circuit 22, a CPU 23 for controlling the electronic watch 1, a ROM 24, an input circuit 26, a bus 27, a first control circuit 30, and a first communication device 35. CPU is an abbreviation for Central Processing Unit, and ROM is an abbreviation for Read Only Memory.

The oscillating circuit 21 causes the crystal oscillator 11, which is a reference signal source, to high-frequency oscillate, and outputs an oscillation signal at a predetermined frequency generated by the high-frequency oscillation to the frequency dividing circuit 22.

The frequency dividing circuit 22 frequency-divides an output of the oscillating circuit 21 to supply a timing signal or clock signal to the CPU 23.

The ROM 24 stores various programs to be executed by the CPU 23. In the present exemplary embodiment, the ROM 24 stores a program for realizing a basic clock function, and the like.

The CPU 23 executes the program stored in the ROM 24 to realize each function. As described below, the CPU 23 functions as a switching controller 23A that switches and controls first control processing for driving the motor 13 by the first control circuit 30, and second control processing for driving the motor 13 by a second control circuit 50. When performing the second control processing, the switching controller 23A operates the second control circuit 50 of the IC 40, which will be described later, via the first communication device 35.

The switching controller 23A continuously performs the first control processing during a normal hand operation of a hand, switches to the second control processing during a fast-forward hand operation of a hand, and switches to the first control processing when the fast-forward hand operation ends. Note that, the fast-forward hand operation is performed, for example, when the button 9 is long pressed to modify an indication of a hand. Furthermore, in a radio wave clock that receives a satellite radio wave or a standard radio wave to modify a time, the fast-forward hand operation is also performed when an indication of a hand is modified by the received radio wave.

The input circuit 26 outputs a state of each of the input terminals P1 and P2 to the bus 27. The bus 27 is used for data transfer and the like, among the CPU 23, the input circuit 26, the first control circuit 30, and the first communication device 35. The first communication device 35 is an interface for communicating with the IC 40.

Figure 3:
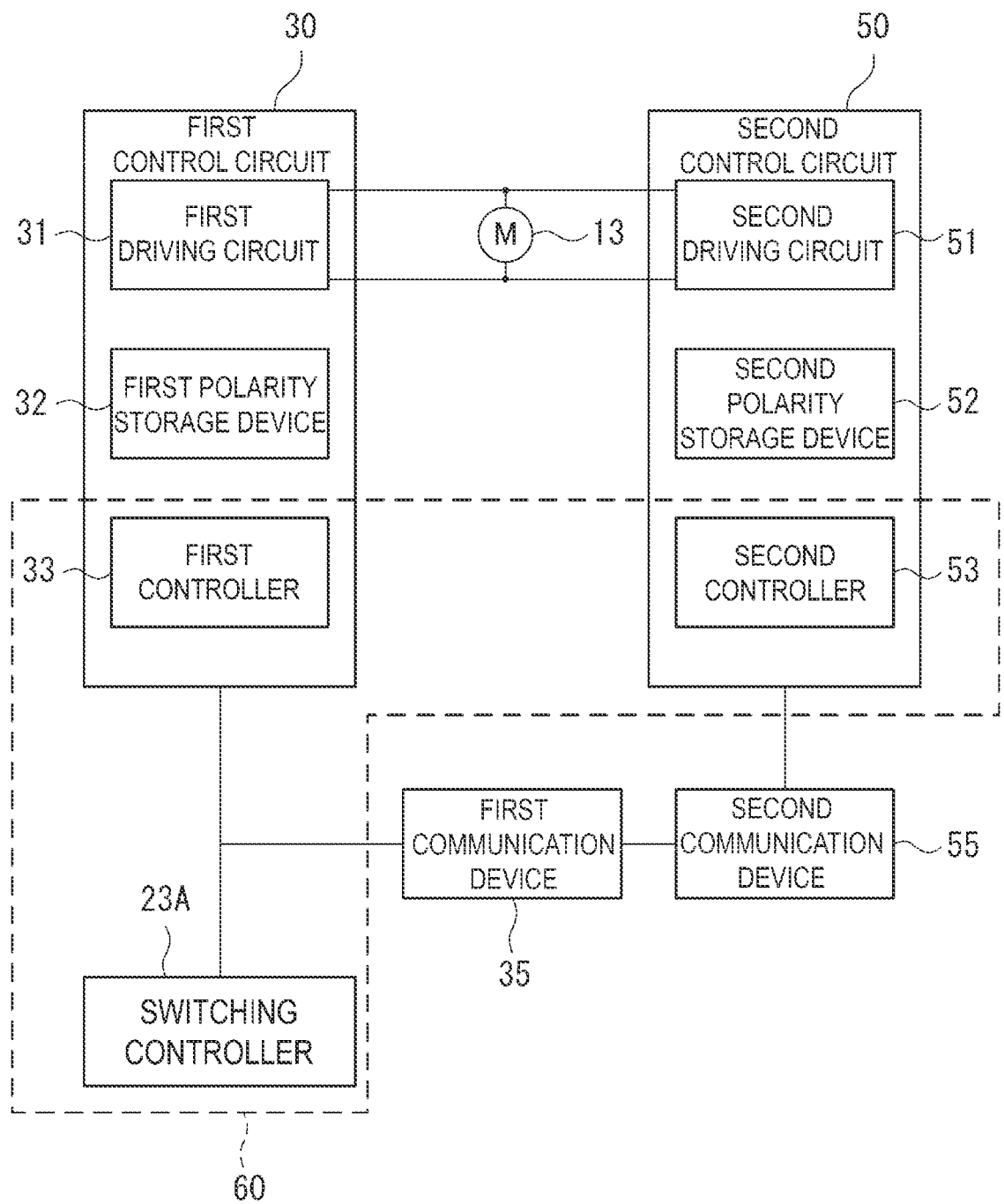
FIG. 3 is a block diagram illustrating a configuration of a control device of the electronic watch according to the first exemplary embodiment.

As illustrated in FIG. 3, the first control circuit 30 includes a first driving circuit 31, a first polarity storage device 32, and a first controller 33.

The first driving circuit 31 is a circuit that outputs a first motor drive signal in line with a polarity to the motor 13. In the present exemplary embodiment, the first driving circuit 31 is a motor driver that drives the motor 13 by constant voltage driving. Thus, the first driving circuit 31 outputs a constant voltage rectangular pulse as the first motor drive signal, and controls a pulse width of the rectangular pulse to adapt to a load variation of the motor 13.

The first polarity storage device 32 is a device that stores first polarity information indicating a polarity of a first motor drive signal to be output by the first driving circuit 31 next. Since the motor 13 is the bipolar single-phase stepping motor as described above, as the first motor drive signal as well, a signal in line with the polarity of the motor 13 needs to be output. In the present exemplary embodiment, as the first polarity information stored in the first polarity storage device 32, either "0" indicating one of two polarities or "1" indicating another is stored. Then, the first driving circuit 31 sets a polarity of a first motor drive signal to be output next with reference to the first polarity information of the first polarity storage device 32.

In addition, the first polarity storage device 32 can rewrite the first polarity information from "0" to "1" or from "1" to "0" only when the first driving circuit 31 outputs a first motor drive signal.

The first communication device 35 is a device for transmitting first polarity information to the second control circuit 50.

The first controller 33 controls operation of the first driving circuit 31, the first polarity storage device 32, and the first communication device 35. In addition, each time the first driving circuit 31 outputs a first motor drive signal, the first controller 33 outputs a rewrite control signal for rewriting a polarity to the first polarity storage device 32, and the first polarity information is alternately rewritten to either "0" or "1". In other words, when the polarity of the first polarity storage device 32 needs to be rewritten, the first controller 33 causes the first driving circuit 31 to output the first motor drive signal, and outputs the rewrite control signal to the first polarity storage device 32.

Further, the first controller 33 transmits the first polarity information to the second control circuit 50 via the first communication device 35 and the second communication device 55.

Circuit Configuration of Second IC 40

Returning to FIG. 2, the second IC 40 includes a bus 47, the second control circuit 50, and the second communication device 55.

The bus 47 is used for data transfer and the like between the second control circuit 50 and the second communication device 55.

The second communication device 55 is an interface for communicating with the first IC 20.

As illustrated in FIG. 3, the second control circuit 50 includes a second driving circuit 51, a second polarity storage device 52, and a second controller 53.

The second driving circuit 51 is a circuit that outputs a second motor drive signal in line with a polarity to the motor 13. In the present exemplary embodiment, the second driving circuit 51 is a motor driver that drives the motor 13 by constant current driving. The second driving circuit 51, by outputting a second motor drive signal that turns a drive current off when a drive current reaches an upper limit value, and turns the drive current on when the drive current reaches a lower limit value, outputs a nearly constant current drive signal to drive the motor 13, and determines rotation of a rotor, by a time during which the drive current is turned on, or the like. The second driving circuit 51 by the constant current driving can drive the motor 13 faster compared to the first driving circuit 31 by the constant voltage driving.

The second polarity storage device 52 is a device that stores second polarity information indicating a polarity of a second motor drive signal to be output by the second driving circuit 51 next. In the present exemplary embodiment, the second polarity information stored in the second polarity storage device 52, as with the first polarity information described above, either "0" indicating one of the two polarities or "1" indicating the other is stored. Then, the second driving circuit 51 sets a polarity of a second motor drive signal to be output next with reference to the second polarity information of the second polarity storage device 52.

In addition, the second polarity storage device 52 can perform rewriting based on a rewrite control signal of the second controller 53, as well as when the second driving circuit 51 outputs the second motor drive signal.

The second communication device 55 is a device for transmitting second polarity information to the first control circuit 30.

The second controller 53 controls operation of the second driving circuit 51, the second polarity storage device 52, and the second communication device 55. In addition, each time the second driving circuit 51 outputs a second motor drive signal, the second controller 53 outputs a rewrite control signal for rewriting a polarity to the second polarity storage device 52, and in each case the second polarity information is alternately rewritten to either "0" or "1". Further, the second controller 53 is capable of outputting a rewrite control signal for rewriting a polarity to the second polarity storage device 52 without the second driving circuit 51 outputting a second motor drive signal.

Further, the second controller 53 transmits second polarity information to the first control circuit 30 via the second communication device 55 and the first communication device 35.

As illustrated in FIG. 3, the switching controller 23A, the first controller 33, and the second controller 53 constitute a control device 60 that controls driving of the motor 13.

Motor Drive Control Processing

Next, motor control processing by the control device 60 will be described with reference to flowcharts of FIG. 4 and FIG. 5.

The switching controller 23A of the electronic watch 1 performs first control processing in which the first control circuit 30 is operated as a motor driver during a normal hand operation. Note that, in the present exemplary embodiment, in order to operate the seconds hand 5, the minute hand 6, and the hour hand 7 with one motor 13, the motor 13 is driven per second, and this driving per second drive operates the seconds hand 5 by one second, and the minute hand 6 and the hour needle 7 are also interlocked and operated.

First Control Processing

Figure 4:
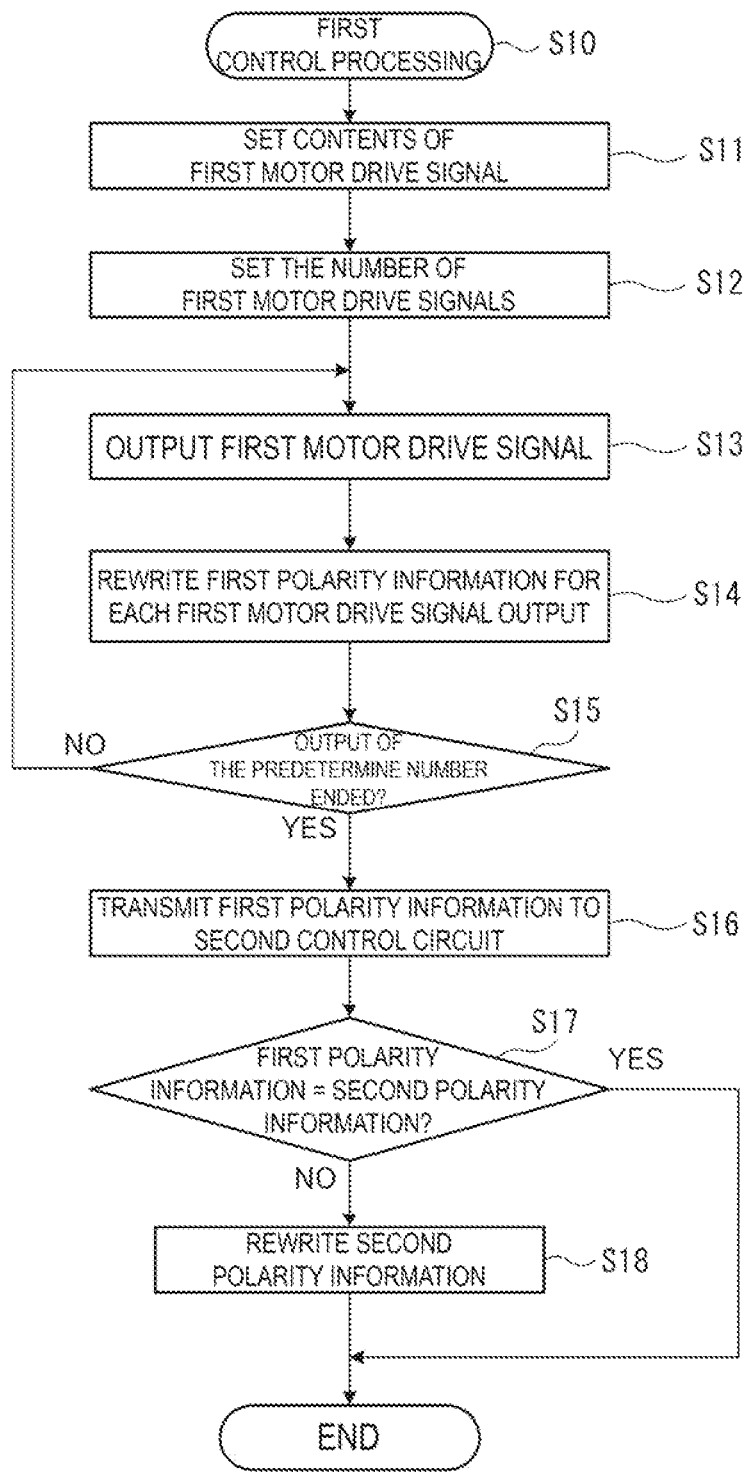
FIG. 4 is a flowchart illustrating first control processing according to the first exemplary embodiment.

The switching controller 23A performs first control processing of step S10 illustrated in FIG. 4 every one second, which is a hand operation interval of a hand. When starting the first control processing, the switching controller 23A operates the first control circuit 30, and the first controller 33 of the first control circuit 30 performs step S11. Step S11 is a step for setting contents of a first motor drive signal, specifically for setting a polarity and a pulse width of a first motor drive signal to be output next.

That is, the first control circuit 30 drives and controls the motor 13 by constant voltage control, and adjusts energy of a drive signal applied to the motor 13 by the pulse width. For example, adjustment is performed in which, in a case of successful driving of the motor 13 with a previous first motor drive signal, the pulse width is decreased by one step, and in a case of non-successful driving of the motor 13, the pulse width is increased by one step, and the like, and the pulse width of the first motor drive signal is controlled to the minimum necessary to drive the motor 13, to achieve reliable hand operation and power saving in a compatible manner. One first motor drive signal is a drive signal for rotating a rotor of the motor 13 by 180 degrees, that is, for moving a hand by one step.

In addition, the first controller 33, with reference to first polarity information stored in the first polarity storage device 32, sets a polarity of a first motor drive signal to be output next.

Next, the first controller 33 performs step S12. Step S12 sets the number of first motor drive signals to be output. Since the number to be output during a normal hand operation is preset, the first controller 33 sets that set value to the number to be output. For example, in the present exemplary embodiment, in order to drive the motor 13 by one step per second, the set value for the number of first motor drive signals to be output is "1". This set value is set according to a type of hand driven by the motor 13, and the like.

Next, the first controller 33 performs step S13 and operates the first driving circuit 31 to output a first motor drive signal. In other words, the first driving circuit 31 starts outputting the first motor drive signal with the contents set in step S11.

Next, the first controller 33 performs step S14. Step S14 is a step for rewriting first polarity information, and the first controller 33 outputs a rewrite control signal of the first polarity information to the first polarity storage device 32, each time the first driving circuit 31 outputs the first motor drive signal.

As a result, the first polarity information stored in the first polarity storage device 32 is alternately rewritten to either "0" or "1".

Next, the first controller 33 performs step S15. Step S15 determines whether the preset number of the first motor drive signals, set in step S12, are output or not. When determining NO in step S15, the first controller 33 continues outputting the first motor drive signal in step S13, and rewrites the first polarity information each time the first motor drive signal is output in step S14.

On the other hand, when determining YES in step S15, the first controller 33 output the number of first motor drive signals set in step S12, and thus stops outputting the first motor drive signal by the first driving circuit 31 without returning to step S13.

Next, the first controller 33 performs step S16. Step S16 is a step for transmitting the first polarity information to the second control circuit 50. The first controller 33 reads the first polarity information stored in the first polarity storage device 32, and operates the first communication device 35 to transmit the first polarity information to the second control circuit 50. The first polarity information stored in the first polarity storage device 32 is polarity information rewritten by a first motor drive signal output last, and is information indicating a polarity of a motor drive signal to be output next.

The first polarity information transmitted from the first communication device 35 is received by the second communication device 55. Upon receiving the first polarity information by the second communication device 55, the second controller 53 performs step S17. Step S17 is a comparison step for each polarity information. When performing step S17, the second controller 53 compares the first polarity information received by the second communication device 55 with second polarity information stored in the second polarity storage device 52, and determines whether the both match or not.

When determining NO in step S17, the second controller 53 performs step S18. Step S18 is a rewriting step of the second polarity information, and the second controller 53 outputs a rewrite control signal to the second polarity storage device 52, and rewrites the second polarity information to match with the first polarity information. Thus, when outputting a second motor drive signal next, the second driving circuit 51 can output a second motor drive signal in line with a polarity of the motor 13.

After performing step S18, the second controller 53 ends the first control processing.

On the other hand, when determining YES in step S17, the second controller 53 need not rewrite the second polarity information, and thus ends the first control processing.

The above-described first control processing is continued unless the switching controller 23A switches to the second control processing, and the switching controller 23A performs the first control processing at the hand operation interval, for example, per second.

Second Control Processing

Figure 5:
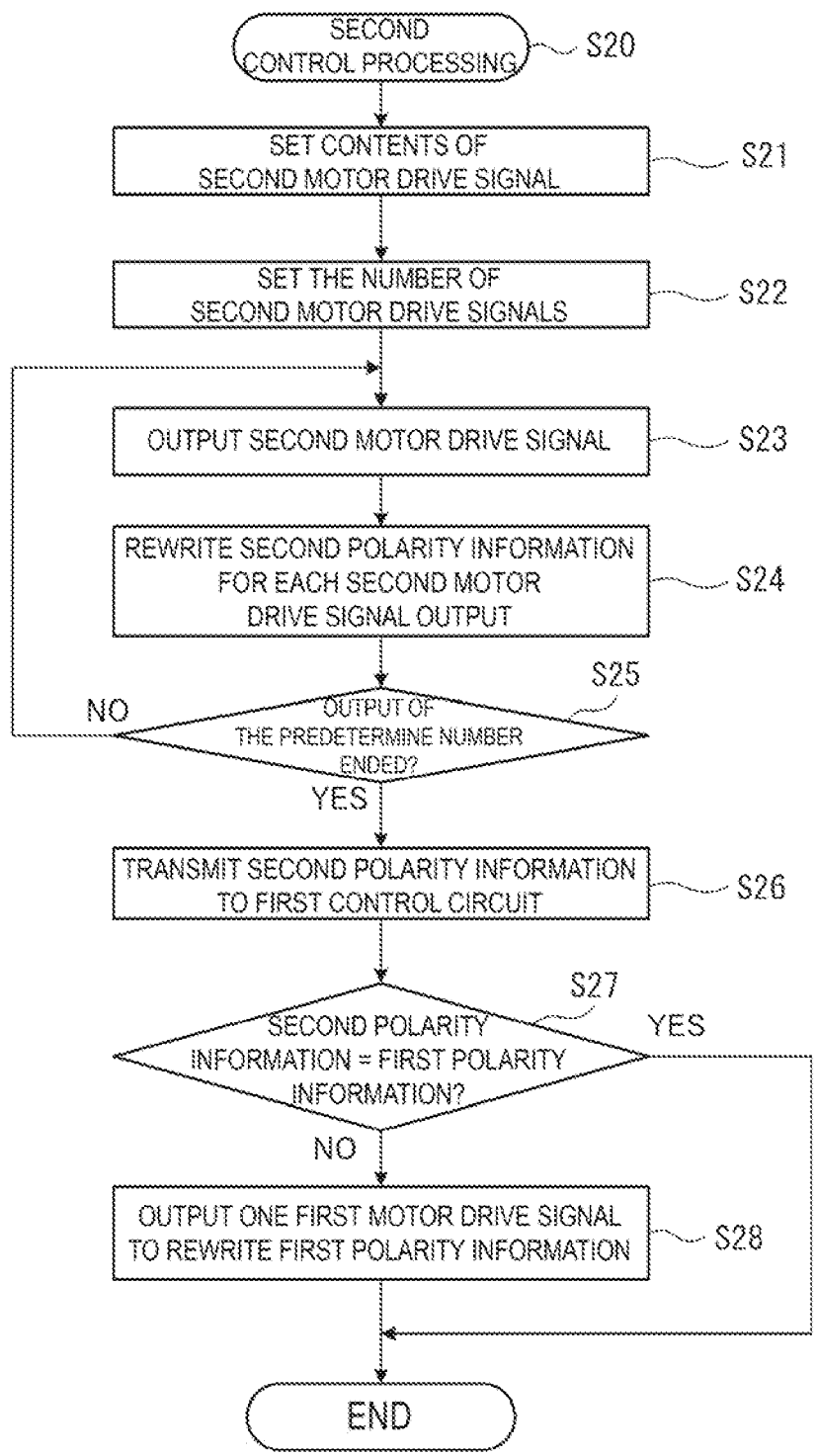
FIG. 5 is a flowchart illustrating second control processing according to the first exemplary embodiment.

As described above, when performing a hand fast-forward processing, the switching controller 23A performs second control processing in step S20 illustrated in FIG. 5.

The switching controller 23A operates the second control circuit 50 that performs step S20 via the first communication device 35 and the second communication device 55, and the second controller 53 of the second control circuit 50 performs step S21. Step S21 is a step for setting contents of a second motor drive signal, specifically for setting a polarity and the like of a second motor drive signal to be output next. One second motor drive signal is a drive signal for rotating the rotor of the motor 13 by 180 degrees, that is, moving a hand by one step.

In addition, the second controller 53, with reference to second polarity information stored in the second polarity storage device 52, sets a polarity of a second motor drive signal to be output next.

Next, the second controller 53 performs step S22. Step S22 sets the number of the second motor drive signals to be output. The second controller 53 sets the number to be output in accordance with an amount of a fast-forward hand operation. For example, when a hand is fast-forwarded by long pressing of the button 9, the second controller 53 sets the number to be output in accordance with a time during which the button 9 is pressed. In addition, when a time indication is modified by radio wave reception, the second controller 53 sets the number to be output in accordance with an amount of modification from a current indication time to a current time after the modification.

Next, the second controller 53 performs step S23, and operates the second driving circuit 51 to output a second motor drive signal. In other words, the second driving circuit 51 starts outputting the second motor drive signal with the contents set in step S21.

Next, the second controller 53 performs step S24. Step S24 is a step for rewriting the second polarity information, and the second controller 53 outputs a rewrite control signal of the second polarity information to the second polarity storage device 52, each time the second driving circuit 51 outputs the second motor drive signal.

As a result, the second polarity information stored in the second polarity storage device 52 is alternately rewritten to either "0" or "1".

Next, the second controller 53 performs step S25. Step S25 determines whether the preset number of the second motor drive signals, set in step S22, are output or not. When determining NO in step S25, the second controller 53 continues outputting the second motor drive signal in step S23, and rewrites the second polarity information each time the second motor drive signal is output in step S24.

On the other hand, when determining YES in step S25, the second controller 53 output the number of second motor drive signals set in step S22, and thus stops outputting the second motor drive signal by the second driving circuit 51 without returning to step S23.

Next, the second controller 53 performs step S26. Step S26 is a step for transmitting the second polarity information to the first control circuit 30. The second controller 53 reads the second polarity information stored in the second polarity storage device 52, and operates the second communication device 55 to transmit the second polarity information to the first control circuit 30. The second polarity information stored in the second polarity storage device 52 is polarity information rewritten by a second motor drive signal output last, and is information indicating a polarity of a motor drive signal to be output next.

The second polarity information transmitted from the second communication device 55 is received by the first communication device 35. Upon receiving the second polarity information by the first communication device 35, the first controller 33 performs step S27. Step S27 is a comparison step for each polarity information. When performing step S27, the first controller 33 compares the second polarity information received by the first communication device 35 with first polarity information stored in the first polarity storage device 32, and determines whether the both match or not.

When determining NO in step S27, the first controller 33 performs step S28. Step S28 is a step for rewriting the first polarity information, and the first controller 33 outputs one first motor drive signal by the first driving circuit 31, and rewrites the first polarity information stored in the first polarity storage device 32 to match with the second polarity information. Note that, when the first polarity information does not match with the second polarity information, even when the first motor drive signal based on this first polarity information is output to the motor 13, a polarity of the motor 13 does not match with the first motor drive signal, so the rotor of the motor 13 does not rotate. Accordingly, the first motor drive signal output in step S28 is only utilized for rewriting the first polarity information of the first polarity storage device 32.

By rewriting the first polarity information to match with the second polarity information, when outputting a first motor drive signal next, the first driving circuit 31 can output a first motor drive signal in line with the polarity of the motor 13.

After performing step S28, the first controller 33 ends the second control processing.

On the other hand, when determining YES in step S27, the first controller 33 need not rewrite the first polarity information, and thus ends the second control processing.

When ending the second control processing, the switching controller 23A switches to the first control processing, which is normal hand operation control. For this reason, the switching controller 23A performs the first control processing at the hand operation interval, for example, per second.

Advantageous Effects of First Exemplary Embodiment

According to the present exemplary embodiment, when the first driving circuit 31 of the first control circuit 30 and the second driving circuit 51 of the second control circuit 50 are switched to drive the motor 13, an update of a polarity of the motor 13 by a driving circuit before the switching is stored as polar information in a polarity storage device, and the polarity information is transmitted such that a switching drive device after the switching can refer thereto, thus the driving circuit after the switching can output a motor drive signal corresponding to the polarity updated before the switching. Thus, it is possible to prevent outputting a motor drive signal that is different from the polarity of the motor 13 from the driving circuit after the switching, and thus a problem can be prevented in which a motor drive signal having a different polarity is output and the motor 13 is not driven, and the number of the motor drive signals to be output and the number of drives of the motor 13 does not match, and a hand indication is also shifted. Thus, even when the motor 13 is switched and driven by the two driving circuits, a hand indication is not shifted, and the motor 13 can be driven accurately.

When first polarity information stored in the first polarity storage device 32 is rewritten each time a first motor drive signal is output from the first driving circuit 31, second polarity information stored in the second polarity storage device 52 is rewritten each time a second motor drive signal is output from the second driving circuit 51, and outputting of the predetermined number of motor drive signals is ended, transmission processing of the polarity information and processing for matching with the received polarity information are performed, thus the driving circuit can be immediately operated to output the motor drive signal, when the driving circuit is switched by the switching controller 23A. Thus, the motor 13 can be immediately driven, compared to a case where the polarity information is confirmed after switching the driving circuit, and a hand operation of a hand can be started immediately when the hand is fast-forwarded, and can be driven in a short amount of time.

Further, transmission processing of polarity information at a time of outputting the predetermined number of motor drive signals, and processing for matching polarity information for which a motor drive signal is output are performed in the first control processing and the second control processing, and a circuit for determining whether or not switching to a driving circuit different from the previous time was performed, and a storage device that stores which driving circuit performed driving at the previous time are not necessary, thus the IC 20 can be reduced in size.

Since the motor 13 is driven by the two driving circuits, that is, the first driving circuit 31 and the second driving circuit 51, the driving circuits 31 and 51 can have circuit configurations suitable for applications respectively. That is, when a normal hand operation and a fast-forward hand operation are realized with one driving circuit, the circuit is increased in size, and thus it is difficult to optimize each driving circuit for each hand operation. In contrast, when the two driving circuits are provided, as in the present exemplary embodiment, a circuit of each driving circuit can be reduced in size, that is, each of the IC 20 and IC 40 can be reduced in size, and optimization for each hand operation can be easily achieved.

The first control circuit 30 outputs a first motor drive signal to rewrite the first polarity information in the first polarity storage device 32. Since a motor of an electronic watch is normally driven by only one motor driving circuit, there is no need to rewrite polarity information from an outside, and polarity information is rewritten in accordance with an output of a motor drive signal. Thus, as the first control circuit 30, a control circuit having such an existing motor driving circuit can be used as is, and a cost can be reduced.

Furthermore, the first controller 33 of the first control circuit 30 determines whether or not first polarity information matches with second polarity information in step S27, and outputs a first motor drive signal only in a case of a mismatch to rewrite the first polarity information, and therefore, a frequency of outputting the first motor drive signal can be reduced, and power consumption can be reduced accordingly.

The second control circuit 50 rewrites the second polarity information in the second polarity storage device 52 with a rewrite control signal, and thus, power for rewriting can be reduced compared to a case where rewriting is performed by outputting a motor drive signal. Furthermore, the second controller 53 of the second control circuit 50 determines whether or not the second polarity information matches with the first polarity information in step S17, and rewrites the second polarity information only in the case of a mismatch, and therefore, unnecessary rewriting processing can be eliminated and the power consumption can be further reduced.

Furthermore, by combining the first IC 20 for which an existing motor driving circuit is applicable, and the second IC 40 enabling power saving, and particularly capable of performing motor driving optimal for fast-forward, power saving and efficient motor driving can be achieved easily at low cost.

Whether the first polarity information and the second polarity information match or not is determined by comparing the polarity information received by the first communication device 35 and the second communication device 55 with the polarity information stored in the first polarity storage device 32 and the second polarity storage device 52, thus the determination can be easily performed. In particular, the motor 13 is a bipolar single-phase motor, and the polarity information has two types of "0" and "1", thus the determination can be easily performed.

In the present exemplary embodiment, by combining the first control circuit 30 for constant voltage control that can adjust a pulse width of a first motor drive signal to the minimum to achieve power saving, and the second control circuit 50 for constant current control that enables higher speed hand operation control compared to the constant voltage control, power consumption during a normal hand operation can be reduced, and a speed during a high speed hand operation can be increased, and motor drive control that achieves both power saving and convenience can be achieved in a compatible manner.

Second Exemplary Embodiment

Figure 6:
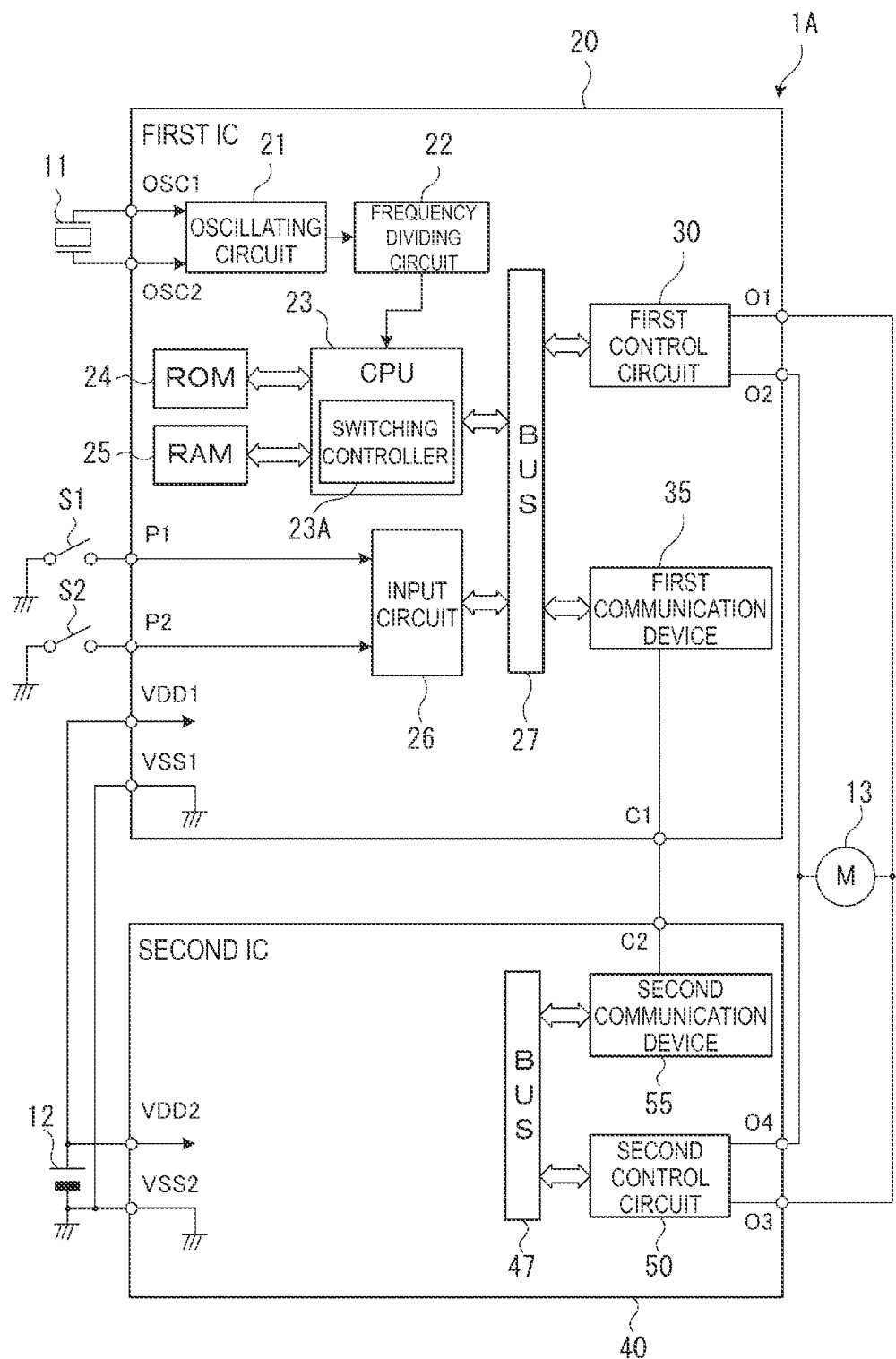
FIG. 6 is a block diagram illustrating a circuit configuration of an electronic watch according to a second exemplary embodiment.

Next, an electronic watch 1A according to a second exemplary embodiment will be described with reference to a block diagram of FIG. 6.

The electronic watch 1A differs from the electronic watch 1 in that a RAM 25 is provided, and the other configurations are the same as those of the electronic watch 1. As described below, the RAM 25 is a storage device that stores in which of the first control circuit 30 and the second control circuit 50, previous motor drive was performed. Note that, RAM is an abbreviation for Random Access Memory.

Next, first control processing and second control processing of the electronic watch 1A will be described based on flowcharts of FIG. 7 and FIG. 8.

The electronic watch 1 of the second exemplary embodiment checks by which of the first control circuit 30 and the second control circuit 50, immediately preceding motor drive was performed, and performs processing to match polarity information when the motor drive was performed by a control circuit different from the previous time.

First Control Processing

Figure 7:
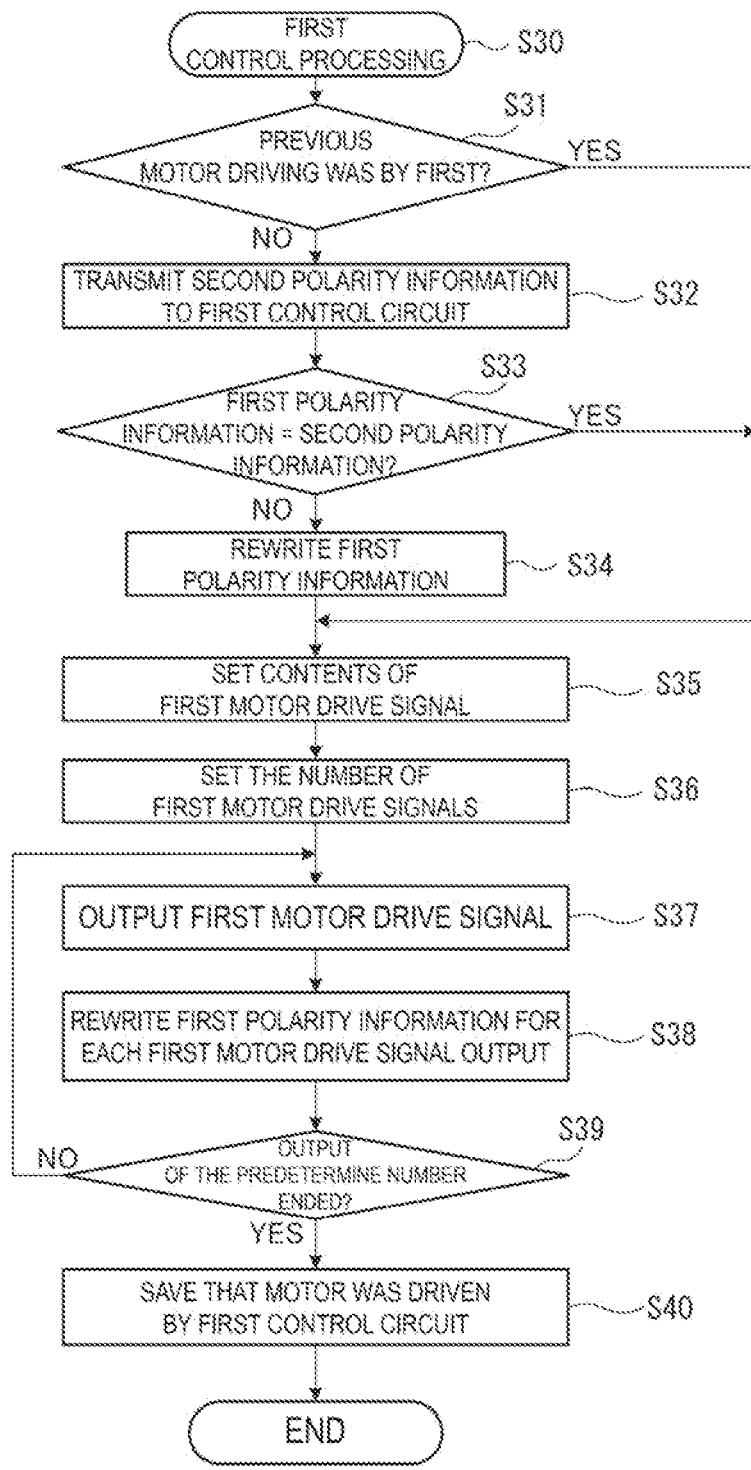
FIG. 7 is a flowchart illustrating first control processing according to the second exemplary embodiment.

The switching controller 23A of the electronic watch 1A performs first control processing of step S30 illustrated in FIG. 7 every one second, which is a hand operation interval. When starting step S30, the switching controller 23A performs step S31. Step S31 is a step for determining whether previous motor drive was performed by the first control circuit 30 or not. That is, the switching controller 23A stores whether immediately preceding motor drive was performed by the first control circuit 30, or by the second control circuit 50 in the RAM 25. Thus, in step S31, the switching controller 23A references the RAM 25 to determine whether the previous motor drive was performed by the first control circuit 30 or not.

When determining NO in step S31, the switching controller 23A operates the second control circuit 50 to perform step S32. When step S32 is performed, the second controller 53 of the second control circuit 50 reads second polarity information stored in the second polarity storage device 52, and transmits the second polarity information to the first control circuit 30 via the second communication device 55 and the first communication device 35. The second polarity information stored in the second polarity storage device 52 is polarity information rewritten by the second motor drive signal output last by the previous motor drive, and is information indicating a polarity of a motor drive signal to be output next.

The second polarity information transmitted from the second communication device 55 is received by the first communication device 35 of the IC 20. Upon receiving the second polarity information by the first communication device 35, the first controller 33 performs step S33. When performing step S33, the first controller 33 compares the second polarity information received by the first communication device 35 with first polarity information stored in the first polarity storage device 32, and determines whether the both match or not.

When determining NO in step S33, the first controller 33 performs step S34. Step S34 is a step for rewriting the first polarity information, and the first controller 33 outputs one first motor drive signal by the first driving circuit 31, and rewrites the first polarity information to match with the second polarity information. Thus, when outputting a first motor drive signal next, the first driving circuit 31 can output a first motor drive signal in line with a polarity of the motor 13.

On the other hand, when determining YES in step S31, the switching controller 23A transits to step S35, which is a motor driving process by the first control circuit 30, without performing steps S32 to S34. That is, when the first control circuit 30 drove the motor 13 also in the previous time, the first polarity information is set to polarity information when a first motor drive signal is to be output next. Therefore, since it is not necessary to receive second polarity information and rewrite first polarity information, steps S32 to S34 are not performed and the processing transits to step S35.

Further, when determining YES in step S33, the first controller 33 does not need to rewrite the first polarity information, and thus transits to step S35 without performing step S34.

Next, the first controller 33 performs processes in steps S35 to S39. These steps S35 to S39 are the same processes as those of steps S11 to S15 of the first exemplary embodiment, and thus descriptions thereof will be omitted.

When determining YES in step S39, the first controller 33 performs step S40 by the switching controller 23A. Step S40 is a step for storing that the motor was driven by the first control circuit 30 in the RAM 25.

When performing step S40, the switching controller 23A ends the first control processing.

The above-described first control processing is continued unless the switching controller 23A switches to the second control processing, and the switching controller 23A performs the first control processing at the hand operation interval, for example, per second.

Second Control Processing

Figure 8:
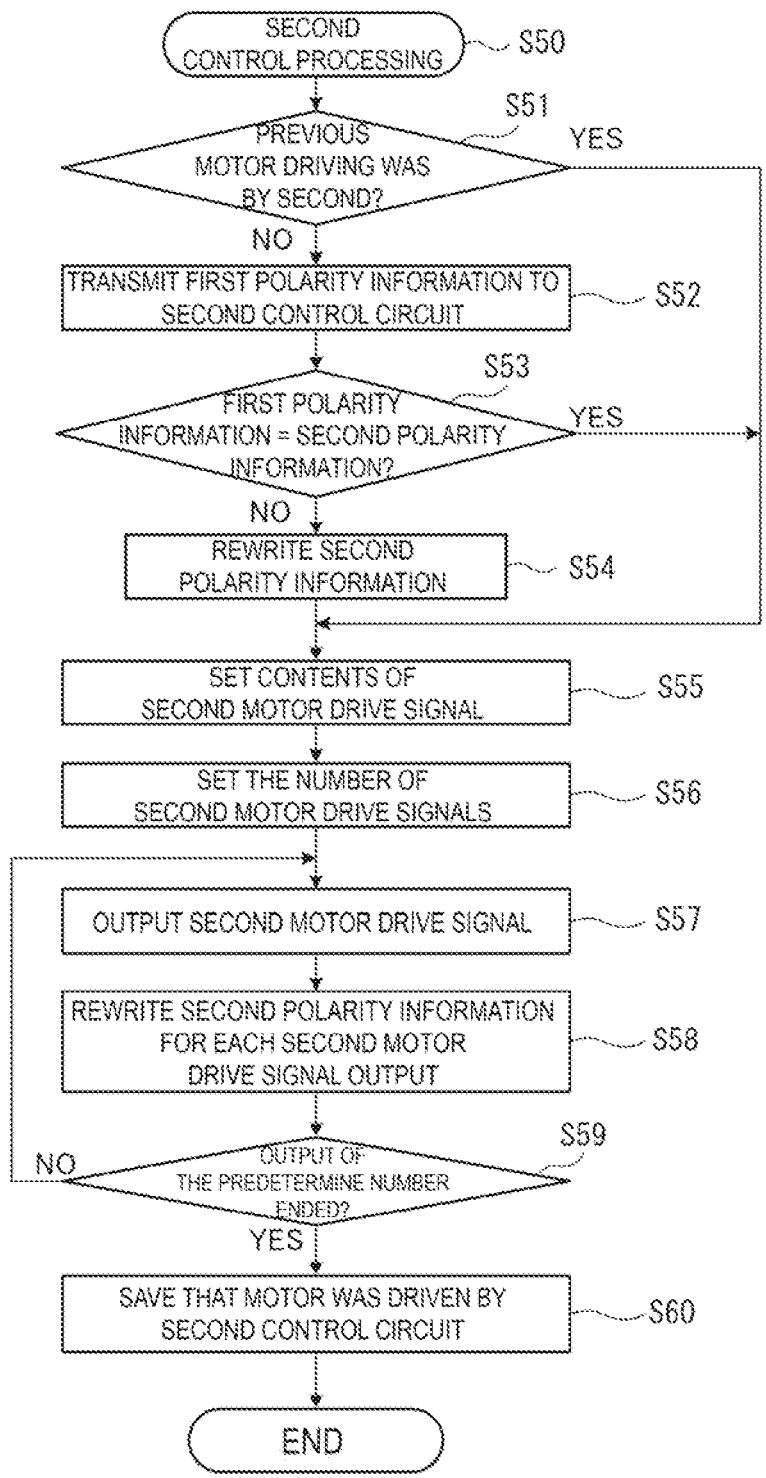
FIG. 8 is a flowchart illustrating second control processing according to the second exemplary embodiment.

As in the first exemplary embodiment, when performing hand fast-forward processing, the switching controller 23A performs the second control processing in step S50 illustrated in FIG. 8.

When starting step S50, the switching controller 23A performs step S51. Step S51 is a step of determining whether previous motor drive was performed by the second control circuit 50 or not. Thus, in step S51, the switching controller 23A references the RAM 25 to determine whether the previous motor drive was performed by the second control circuit 50 or not.

When determining NO in step S51, the switching controller 23A operates the first control circuit 30 to perform step S52. When step S52 is performed, the first controller 33 of the first control circuit 30 reads first polarity information stored in the first polarity storage device 32, and transmits the first polarity information to the second control circuit 50 via the first communication device 35 and the second communication device 55. The first polarity information stored in the first polarity storage device 32 is polarity information rewritten by a first motor drive signal output last in the previous motor drive, and is information indicating a polarity of a motor drive signal to be output next.

The first polarity information transmitted from the first communication device 35 is received by the second communication device 55 of the IC 40. Upon receiving the first polarity information by the second communication device 55, the second controller 53 performs step S53. When performing step S53, the second controller 53 compares the first polarity information received by the second communication device 55 with second polarity information stored in the second polarity storage device 52, and determines whether the both match or not.

When determining NO in step S53, the second controller 53 performs step S54. Step S54 is a rewriting step of the second polarity information, and the second controller 53 outputs a rewrite control signal, and rewrites the second polarity information to match with the first polarity information. Thus, when outputting a second motor drive signal next, the second driving circuit 51 can output a motor drive signal in line with a polarity of the motor 13.

On the other hand, when determining YES in step S51, the switching controller 23A transits to step S55, which is a motor driving process by the second control circuit 50, without performing steps S52 to S54. That is, when the second control circuit 50 drove the motor 13 also in the previous time, the second polarity information is set to polarity information when a second motor drive signal is to be output next. Therefore, since it is not necessary to receive first polarity information and rewrite second polarity information, steps S52 to S54 are not performed and the processing transits to step S55.

Further, when determining YES in step S53, the second controller 53 does not need to rewrite the second polarity information, and thus transits to step S55 without performing step S54.

Next, the second controller 53 performs processes in steps S55 to S59. These steps S55 to S59 are the same processes as those of steps S21 to S25 of the first exemplary embodiment, and thus descriptions thereof will be omitted.

When determining YES in step S59, the second controller 53 performs step S60 by the switching controller 23A. Step S60 is a step for storing that the motor was driven by the second control circuit 50 in the RAM 25.

When performing step S60, the switching controller 23A ends the second control processing.

When ending the second control processing, the switching controller 23A switches to the first control processing, which is normal hand operation control. For this reason, the switching controller 23A performs the first control processing at the hand operation interval, for example, per second.

Advantageous Effects of Second Exemplary Embodiment

According to the second exemplary embodiment as well, drive of the motor 13 is controlled by two control circuits, that is, the first control circuit 30 and the second control circuit 50, the same effects as those of the first exemplary embodiment can be achieved.

In addition, in step S31 of first control processing and in step S51 of second control processing, whether driving is to be performed by a driving circuit different from a previous motor driving circuit is determined, and only when driving is performed by a different driving circuit, that is, only when polarity information needs to be rewritten, steps S32, S52 for transmitting polarity information, steps S33, S53 for determining match of polar information, steps S34 and S54 for performing rewriting when the polarity information does not match are performed. Since each of these steps S32 to S34, S52 to S54 can be performed only when necessary, communication processing or rewriting processing of the polarity information can be minimized, and power consumption can be further reduced compared to the first exemplary embodiment.

Other Exemplary Embodiments

Note that, the present disclosure is not limited the exemplary embodiments described above, and variations, modifications, and the like within the scope in which the object of the present disclosure can be achieved are included in the present disclosure.

For example, the first polarity storage device 32 of each of the above-described exemplary embodiments rewrites first polarity information in accordance with an output of a first motor drive signal, but, similarly to the second control circuit 50, the first polarity information may be rewritten with a rewrite control signal. In other words, both the first polarity storage device 32 and the second polarity storage device 52 may rewrite first polarity information and second polarity information with a rewrite control signal.

Further, the second polarity storage device 52 of each of the above-described exemplary embodiments rewrites second polarity information with a rewrite control signal, but similar to the first polarity storage device 32, rewriting may be performed in accordance with an output of a second motor drive signal. In other words, both the first polarity storage device 32 and the second polarity storage device 52 may rewrite polarity information by an output of a motor drive signal.

Furthermore, in each of the above-described exemplary embodiments, first polarity information or second polarity information is transmitted in step S16, S26, S32, or S52, and, it is determined whether the first polarity information and the second polarity information match in step S17, S27, S33, or S53, but it may be determined whether or not the rewriting is necessary depending on whether the number of first motor drive signals or second motor drive signals to be output is an even number or an odd number. That is, because the motor 13 is a bipolar single-phase motor, a first polarity "0" and a second polarity "1" are alternately switched. Accordingly, a configuration may be adopted in which, when the number of the first motor drive signals or the second motor drive signals to be output is an even number, rewriting of polarity information is not performed, and in a case of an odd number, first polarity information or second polarity information is transmitted, and rewriting is performed with the transmitted polarity information.

Furthermore, in each of the exemplary embodiments, it is determined whether or not the first polarity information and the second polarity information match in step S17, S27, S33, or S53, and the polarity information is rewritten only in the case of a mismatch, but the polarity information may be rewritten without a determination step performed of whether or not the first polarity information and the second polarity information match. When the second polarity information or first polarity information is rewritten with the transmitted first polarity information or the second polarity information, the first polarity information and the second polarity information can be reliably matched.

The electronic watches 1 and 1A are not limited to watches having three hands of the seconds hand 5, the minute hand 6, and the hour hand 7 as in the exemplary embodiments described above, and for example, may each include a chronograph function, may each include a hand to indicate a day of the week, an amount of remaining battery, various modes, and the like, or may each include a hand other than a hand indicating a time.

Further, it is sufficient that a hand driven by the first control circuit 30 and the second control circuit 50 of the present exemplary embodiment is a hand to perform two types of hand operations, such as a normal hand operation and a fast-forward hand operation, and the hand may be used for driving all motors provided in an electronic watch, or may be used only for driving some motors.

The first driving circuit 31 drives the motor 13 by constant voltage driving and the second driving circuit 51 drives the motor 13 by constant current driving, but it is sufficient that the motor 13 is driven by a driving method suitable for two different types of hand operations, such as a low speed fast-forward hand operation and a high speed fast-forward hand operation, or the first driving circuit 31 and the second driving circuit 51 may use the same driving method.

Each of the first control circuit 30 and the second control circuit 50 holds a storage device for storing a polarity of the motor 13, but a configuration may also be adopted in which only one, for example, only the first control circuit 30 holds the storage device. When only the first control circuit 30 holds the storage device, the IC 40 can be reduced in size. However, in this case, each time the second control circuit 50 is caused to drive the motor 13, the switching controller 23A needs to output a polarity of the motor 13, and thus there is a possibility that a frequency of communication is increased or a communication delay occurs, so each of the first control circuit 30 and the second control circuit 50 may hold a storage device.

The control device 60 is constituted by the switching controller 23A of the CPU 23, the first controller 33, and the second controller 53, but may be constituted only by the CPU 23. That is, a configuration may be adopted in which, the first control circuit 30 and the second control circuit 50 are not provided with a control unit, and the CPU 23 controls the first driving circuit 31, the first polarity storage device 32, the first communication device 35, the second driving circuit 51, the second polarity storage device 52, and the second communication device 55.

SUMMARY OF THE PRESENT DISCLOSURE

A method for controlling an electronic watch of the present disclosure includes a motor configured to drive a hand, a first polarity storage device configured to store first polarity information, a second polarity storage device configured to store second polarity information, a first driving circuit configured to output, to the motor, a first motor drive signal having a polarity corresponding to the first polarity information, a second driving circuit configured to output, to the motor, a second motor drive signal having a polarity corresponding to the second polarity information, and a control device configured to perform switching between first control processing and second control processing, wherein the control device, when performing the first control processing, operates the first driving circuit to output the first motor drive signal, and rewrites the first polarity information in accordance with an output of the first motor drive signal, when ending output of the first motor drive signal, matches the second polarity information with the first polarity information, when performing the second control processing, operates the second driving circuit to output the second motor drive signal, and rewrites the second polarity information in accordance with an output of the second motor drive signal, and when ending output of the second motor drive signal, matches the first polarity information with the second polarity information.

According to such a method for controlling, in the first control processing, the first polarity information stored in the first polarity storage device is rewritten every time the first motor drive signal is output from the first driving circuit, and when the output of the first motor drive signal is ended, the second polarity information is matched with the first polarity information. Further, in the second control processing, the second polarity information stored in the second polarity storage device is rewritten each time the second motor drive signal is output from the second driving circuit, and when the output of the second motor drive signal is ended, the first polarity information is matched with the second polarity information. Thus, even when one control processing is switched to another control processing, it is possible to output a motor drive signal corresponding to a polarity updated before the switching. Accordingly, a problem can be prevented in which, after the switching of the control processing, a motor drive signal having a different polarity is output, the motor does not drive, the number of the motor drive signals to be output and the number of drives of the motor do not match, and an indication of a hand is also shifted. Thus, even when the motor is driven by switching the two driving circuits, an indication of the hand is not shifted, and the motor can be driven accurately.

Furthermore, when polarity information is rewritten each time a motor drive signal is output, and the output of the motor drive signal is ended, that is, when driving in one control processes is ended, processing for matching the polarity information is performed, and thus when the control processing is switched, the driving circuit can be immediately operated to output a motor drive signal. Thus, the motor can be immediately driven compared to a case where polarity information is confirmed after switching a driving circuit, and a hand operation can be started immediately, particularly when the hand is fast-forwarded, and the hand can be driven in a short time.

A method for controlling an electronic watch of the present disclosure includes a motor configured to drive a hand, a first polarity storage device configured to store first polarity information, a second polarity storage device configured to store second polarity information, a first driving circuit configured to output, to the motor, a first motor drive signal having a polarity corresponding to the first polarity information, a second driving circuit configured to output, to the motor, a second motor drive signal having a polarity corresponding to the second polarity information, and a control device configured to perform switching between first control processing and second control processing, wherein the control device, when performing the first control processing switching from the second control processing, matches the first polarity information with the second polarity information, operates the first driving circuit to output the first motor drive signal, and rewrites the first polarity information in accordance with an output of the first motor drive signal, and when performing the second control processing switching from the first control processing, matches the second polarity information with the first polarity information, operates the second driving circuit to output the second motor drive signal, and rewrites the second polarity information in accordance with an output of the second motor drive signal.

According to such a method for controlling, when the second control processing is switched to the first polarity processing, the first polarity information is matched with the second polarity information, and then the first polarity information stored in the first polarity storage device is rewritten each time the first motor drive signal is output from the first driving circuit. Furthermore, when the first control processing is switched to the second polarity processing, the second polarity information is matched with the first polarity information, and then the second polarity information stored in the second polarity storage device is rewritten each time the second motor drive signal is output from the second driving circuit. Thus, even when one control processing is switched to another control processing, it is possible to output a motor drive signal corresponding to a polarity updated before the switching. Accordingly, a problem can be prevented in which, after the switching of the control processing, a motor drive signal having a different polarity is output, the motor does not drive, the number of the motor drive signals to be output and the number of drives of the motor do not match, and an indication of a hand is also shifted. Thus, even when the motor is driven by switching the two driving circuits, an indication of the hand is not shifted, and the motor can be driven accurately.

Furthermore, because processing is performed to match the polarity information when the control processing is switched, when one control processing is repeatedly performed, the polarity information need not be matched. As a result, the processing for matching the polarity information can be minimized, and power consumption can be reduced.

In the method for controlling the electronic watch of the present disclosure, the control device, when matching the first polarity information with the second polarity information, may read the second polarity information, may compare the second polarity information read with the first polarity information, and when different, may rewrite the first polarity information to match with the second polarity information read, and when matching the second polarity information with the first polarity information, may read the first polarity information, may compare the first polarity information read with the second polarity information, and when different, may rewrite the second polarity information to match with the first polarity information read.

Because the processing for matching the polarity information is performed only when each control processing is switched, and the polarity information read and the polarity information stored are compared and are different, the processing for matching the polarity information can be minimized, and power consumption can be reduced.

In the method for controlling the electronic watch of the present disclosure, the control device, when matching the second polarity information with the first polarity information, may output a rewrite control signal to the second polarity storage device to rewrite the second polarity information, and when matching the first polarity information with the second polarity information, may output a rewrite control signal to the first polarity storage device to rewrite the first polarity information.

Because each polarity information is rewritten by the rewrite control signal, power for rewriting can be reduced compared to a case where a motor drive signal is output for perform rewriting.

In the method for controlling the electronic watch of the present disclosure, the control device, when matching the second polarity information with the first polarity information, may operate the second driving circuit to output the second motor drive signal to rewrite the second polarity information, and when matching the first polarity information with the second polarity information, may operate the first driving circuit to output the first motor drive signal to rewrite the first polarity information.

Since each polarity information is rewritten by outputting each motor drive signal, a control device having a typical motor driving circuit for an electronic watch can be utilized, and cost can be reduced.

In the method for controlling the electronic watch of the present disclosure, the control device, when matching the second polarity information with the first polarity information, may output a rewrite control signal to the second polarity storage device to rewrite the second polarity information, and when matching the first polarity information with the second polarity information, may operate the first driving circuit to output the first motor drive signal to rewrite the first polarity information.

Since the two types of control processing that differ in the polarity information rewriting method are performed, a first driving circuit in which an existing motor driving circuit is applied, and a second driving circuit that enables power saving can be combined, thus power saving and efficient motor driving can be easily achieved at low cost.

In the method for controlling the electronic watch of the present disclosure, the first driving circuit may output the first motor drive signal for constant voltage control, and the second driving circuit may output the second motor drive signal for constant current control.

By combining the first control circuit for the constant voltage control that can adjust a pulse width of a first motor drive signal to the minimum to achieve power saving, and the second driving circuit for the constant current control with which high speed hand operation control is possible compared to the constant voltage control, power consumption during a normal hand operation can be reduced, and a speed during a high speed hand operation can be increased, and motor drive control that achieves both power saving and convenience can be achieved in a compatible manner can be realized.

An electronic watch according to the present disclosure includes a motor configured to drive a hand, a first polarity storage device configured to store first polarity information, a second polarity storage device configured to store second polarity information, a first driving circuit configured to output, to the motor, a first motor drive signal having a polarity corresponding to the first polarity information, a second driving circuit configured to output, to the motor, a second motor drive signal having a polarity corresponding to the second polarity information, a first communication device, a second communication device configured to communicate with the first communication device, and a control device configured to perform switching between processing for operating the first driving circuit to output the first motor drive signal, and rewriting the first polarity information in accordance with an output of the first motor drive signal, and processing for operating the second driving circuit to output the second motor drive signal, and rewriting the second polarity information in accordance with an output of the second motor drive signal, wherein the control device performs processing for transmitting the second polarity information to the first communication device by the second communication device, and matching the first polarity information stored in the first polarity storage device with the second polarity information based on the second polarity information received by the first communication device, and processing for transmitting the first polarity information output by the first communication device to the second communication device, and matching the second polarity information stored in the second polarity storage device with the first polarity information based on the first polarity information received by the second communication device.

According to the electronic watch of the present disclosure, the motor is driven by the two driving circuits, that is, the first driving circuit and the second driving circuit, and each of the driving circuits can have a circuit configuration suitable for each application. That is, when a normal hand operation and a fast-forward hand operation are realized with one driving circuit, the circuit is increased in size, and thus it is difficult to optimize each driving circuit for each hand operation. In contrast, according to the electronic watch of the present disclosure, the two driving circuits are provided, so a circuit size can be reduced, and optimization for each hand operation can be easily achieved.

What is claimed is:
1. A method for controlling an electronic watch, the electronic watch comprising:
a motor configured to drive a hand;
a first polarity storage device configured to store first polarity information;
a second polarity storage device configured to store second polarity information;
a first driving circuit configured to output, to the motor, a first motor drive signal having a polarity corresponding to the first polarity information;
a second driving circuit configured to output, to the motor, a second motor drive signal having a polarity corresponding to the second polarity information; and
a control device configured to perform switching between first control processing and second control processing,
the method comprising:
when performing the first control processing,
operating the first driving circuit to output the first motor drive signal, and
rewriting the first polarity information in accordance with an output of the first motor drive signal,
when ending output of the first motor drive signal, matching the second polarity information with the first polarity information,
when performing the second control processing,
operating the second driving circuit to output the second motor drive signal, and
rewriting the second polarity information in accordance with an output of the second motor drive signal, and
when ending output of the second motor drive signal, matching the first polarity information with the second polarity information.

2. The method for controlling the electronic watch according to claim 1, wherein
when matching the first polarity information with the second polarity information,
reading the second polarity information, comparing the second polarity information read with the first polarity information, and when the second polarity information read and the first polarity information are different, rewriting the first polarity information to match with the second polarity information read, and
when matching the second polarity information with the first polarity information,
reading the first polarity information, comparing the first polarity information read with the second polarity information, and when the first polarity information read and the second polarity information are different, rewriting the second polarity information to match with the first polarity information read.

3. The method for controlling the electronic watch according to claim 1, wherein
when matching the second polarity information with the first polarity information, outputting a rewrite control signal to the second polarity storage device to rewrite the second polarity information, and
when matching the first polarity information with the second polarity information, outputting a rewrite control signal to the first polarity storage device to rewrite the first polarity information.

4. The method for controlling the electronic watch according to claim 1, wherein
when matching the second polarity information with the first polarity information, operating the second driving circuit to output the second motor drive signal to rewrite the second polarity information, and
when matching the first polarity information with the second polarity information, operating the first driving circuit to output the first motor drive signal to rewrite the first polarity information.

5. The method for controlling the electronic watch according to claim 1, wherein
when matching the second polarity information with the first polarity information, outputting a rewrite control signal to the second polarity storage device to rewrite the second polarity information, and
when matching the first polarity information with the second polarity information, operating the first driving circuit to output the first motor drive signal to rewrite the first polarity information.

6. The method for controlling the electronic watch according to claim 1, wherein
outputting the first motor drive signal for constant voltage control, by the first driving circuit, and
outputting the second motor drive signal for constant current control, by the second driving circuit.

7. A method for controlling an electronic watch, the electronic watch comprising:
a motor configured to drive a hand;
a first polarity storage device configured to store first polarity information;
a second polarity storage device configured to store second polarity information;
a first driving circuit configured to output, to the motor, a first motor drive signal having a polarity corresponding to the first polarity information;
a second driving circuit configured to output, to the motor, a second motor drive signal having a polarity corresponding to the second polarity information, and
a control device configured to perform switching between first control processing and second control processing, the method comprising:
when performing the first control processing switching from the second control processing,
matching the first polarity information with the second polarity information,
operating the first driving circuit to output the first motor drive signal, and
rewriting the first polarity information in accordance with an output of the first motor drive signal, and
when performing the second control processing switching from the first control processing,
matching the second polarity information with the first polarity information,
operating the second driving circuit to output the second motor drive signal, and
rewriting the second polarity information in accordance with an output of the second motor drive signal.

8. The method for controlling the electronic watch according to claim 7, wherein
when matching the first polarity information with the second polarity information,
reading the second polarity information, comparing the second polarity information read with the first polarity information, and when the second polarity information read and the first polarity information are different, rewriting the first polarity information to match with the second polarity information read, and
when matching the second polarity information with the first polarity information,
reading the first polarity information, comparing the first polarity information read with the second polarity information, and when the first polarity information read and the second polarity information are different, rewriting the second polarity information to match with the first polarity information read.

9. The method for controlling the electronic watch according to claim 7, wherein
when matching the second polarity information with the first polarity information, outputting a rewrite control signal to the second polarity storage device to rewrite the second polarity information, and
when matching the first polarity information with the second polarity information, outputting a rewrite control signal to the first polarity storage device to rewrite the first polarity information.

10. The method for controlling the electronic watch according to claim 7, wherein
when matching the second polarity information with the first polarity information, operating the second driving circuit to output the second motor drive signal to rewrite the second polarity information, and
when matching the first polarity information with the second polarity information, operating the first driving circuit to output the first motor drive signal to rewrite the first polarity information.

11. The method for controlling the electronic watch according to claim 7, wherein
when matching the second polarity information with the first polarity information, outputting a rewrite control signal to the second polarity storage device to rewrite the second polarity information, and
when matching the first polarity information with the second polarity information, operating the first driving circuit to output the first motor drive signal to rewrite the first polarity information.

12. The method for controlling the electronic watch according to claim 7, wherein
outputting the first motor drive signal for constant voltage control, by the first driving circuit, and
outputting the second motor drive signal for constant current control, by the second driving circuit.

13. An electronic watch, comprising:
a motor configured to drive a hand;
a first polarity storage device configured to store first polarity information;
a second polarity storage device configured to store second polarity information;
a first driving circuit configured to output, to the motor, a first motor drive signal having a polarity corresponding to the first polarity information;
a second driving circuit configured to output, to the motor, a second motor drive signal having a polarity corresponding to the second polarity information;
a first communication device;
a second communication device configured to communicate with the first communication device; and
a control device configured to perform switching between processing for operating the first driving circuit to output the first motor drive signal, and rewriting the first polarity information in accordance with an output of the first motor drive signal, and processing for operating the second driving circuit to output the second motor drive signal, and rewriting the second polarity information in accordance with an output of the second motor drive signal, wherein
the control device performs
processing for transmitting the second polarity information to the first communication device by the second communication device, and matching the first polarity information stored in the first polarity storage device with the second polarity information based on the second polarity information received by the first communication device, and processing for transmitting the first polarity information output by the first communication device to the second communication device, and matching the second polarity information stored in the second polarity storage device with the first polarity information based on the first polarity information received by the second communication device.

* * * * *